United States Patent
Tidd et al.

(10) Patent No.: US 11,609,747 B1
(45) Date of Patent: Mar. 21, 2023

(54) DECENTRALIZED APPLICATION DEVELOPMENT AND DEPLOYMENT

(71) Applicant: Amazon Technologies, Inc., Seattle, WA (US)

(72) Inventors: Christopher Edward Tidd, Seattle, WA (US); Alexander Zaharakis, Seattle, WA (US); Luis Antonio Arias, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/489,583

(22) Filed: Sep. 29, 2021

(51) Int. Cl.
  *G06F 8/30* (2018.01)
  *G06F 9/445* (2018.01)
  *G06F 8/60* (2018.01)

(52) U.S. Cl.
  CPC .............. *G06F 8/311* (2013.01); *G06F 8/60* (2013.01); *G06F 9/44521* (2013.01)

(58) Field of Classification Search
  CPC .......... G06F 9/44521; G06F 8/60; G06F 8/36; G06F 8/311
  See application file for complete search history.

(56) References Cited

U.S. PATENT DOCUMENTS

| | | | | |
|---|---|---|---|---|
| 8,595,103 B1 * | 11/2013 | Wargin | ................... | G06Q 10/06 705/38 |
| 9,043,747 B2 | 5/2015 | Eksten et al. | | |
| 9,369,472 B2 | 6/2016 | Saldhana | | |
| 9,584,439 B2 | 2/2017 | Leafe et al. | | |
| 9,853,962 B2 | 12/2017 | Krishnaprasad et al. | | |
| 10,496,386 B1 * | 12/2019 | Ho | ........................ | G06F 9/45508 |
| 10,795,656 B2 | 10/2020 | Li et al. | | |
| 10,942,724 B2 | 3/2021 | Spivak et al. | | |
| 2010/0162232 A1 * | 6/2010 | Bhatia | ........................ | G06F 8/60 717/178 |
| 2012/0266168 A1 * | 10/2012 | Spivak | ...................... | G06F 8/71 718/1 |
| 2018/0267796 A1 * | 9/2018 | Kennedy | .................... | G06F 8/61 |

OTHER PUBLICATIONS

Arcangeli et al., "Automaticdeploymentofdistributedsoftwaresystems:Definitionsandstateoftheart" (Year: 2015).*

* cited by examiner

*Primary Examiner* — Phillip H Nguyen
(74) *Attorney, Agent, or Firm* — S. Scott Foster; Kowert, Hood, Munyon, Rankin & Goetzel, P.C.

(57) ABSTRACT

Decentralized development and deployment of applications is described. An application may be defined as being composed of multiple code libraries, each independently developed and deployed. Packagers of individual code libraries may deploy various versions of respective code libraries in multiple code cells and may further define cell selection criteria for the libraries. An application manifest may be constructed identifying the component code libraries with optional version selection criteria for the libraries. Upon receiving a request for the application for a particular client, a refined manifest for the application may be generated for that client, the refined manifest including identifiers of particular cells for the respective component code libraries. The application may then be generated according to the refined manifest and provided to the client. Subsequent requests for the application for the same client may be serviced according to the refined manifest.

20 Claims, 9 Drawing Sheets

DECENTRALIZED APPLICATION DEVELOPMENT AND DEPLOYMENT

BACKGROUND

Modern application development and deployment frequently relies on the construction of applications from component parts, commonly known as code libraries. Construction of such libraries may differ from that of the applications themselves, with individual authors and packagers of various software components differing within an organization or being from unrelated organizations. Applications may be generated by combining code with specific versions of various libraries to generate a specific version of the application which may then be tested and deployed.

Applications may rely on specific features available in specific versions of code libraries, restricting the version(s) of the libraries which may be used. Further complicating development is the release of new versions of various libraries, as these releases may not be integrated into the application until the application is regenerated and additional tests and deployments are performed. As application development becomes more complex and distributed, this process increasingly becomes a bottleneck in the application deployment process.

Figure 1:
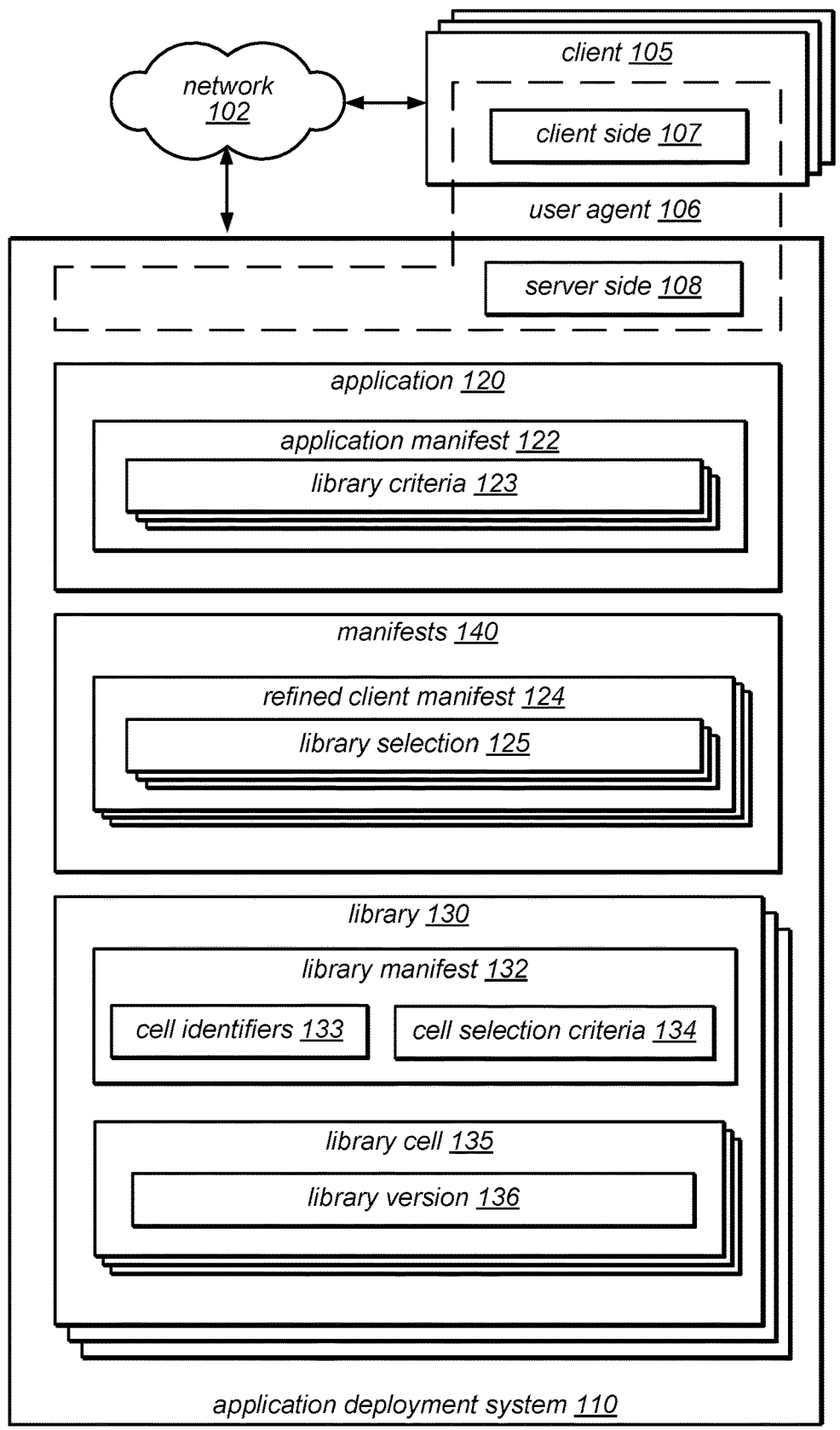
FIG. 1 is a block diagram of a system that implements decentralized application development and deployment, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Systems and methods for decentralized development and deployment of applications are described. An application may be composed of multiple code libraries, each independently developed and deployed. Authors and packagers of individual code libraries may deploy various versions of respective code libraries in multiple code cells and may further define cell selection criteria for the libraries. An application manifest may be constructed identifying the component code libraries with optional version selection criteria for the libraries. Upon receiving a request for the application for a particular client, a refined manifest for the application may be generated for that client, the refined manifest including identifiers of particular cells for the respective component code libraries. The application may then be generated according to the refined manifest and provided to the client. Subsequent requests for the application for the same client may be serviced according to the refined manifest to ensure that a consistent view of the application is provided to that client.

Different teams may be responsible for independent units of application functionality (i.e. libraries or micro-applications) and these teams may aim to deploy these units independently and integrate them into a single client-side application at runtime. Library packagers may define a library topology, a set of arbitrary per-library cell IDs (e.g. A, B, C) and cell selection criteria such as a cell weight or other dynamic selection mechanisms (e.g. conditional weighting driven by an AB testing system). Library packagers may deploy a given version of their library into a given cell. The collective versions deployed into all cells may define a set of available versions per-library. The set of versions deployed into all cells, along with the cell selection criteria may be included in a library manifest for a library.

When a client accesses a network page (e.g., a web browser accessing an Internet web page) or other location containing the application, a client-side agent submits a request to load the application, or otherwise causes a loading of the application manifest, the agent may receive a refined manifest including a subset of the application and library manifests determined by performing cell selection. On a first load of the application, the agent may be assigned a pseudo-random value which may be used to deterministically identify particular cell selections for subsequent loads of the application. By computing an evenly distributed numeric hash of this pseudo-random value and each library identifier, a pseudo-random, but consistent, set of cell selections may be provided to the agent. Different agents may receive different combinations of library cells, but a given client has a consistent experience while using the product. Only if a library packager deploys a new version into a selected cell will the agent a new version of the application.

FIG. 1 is a block diagram of a system that implements decentralized application development and deployment, according to some embodiments. An application deployment system 110 may provide application deployment features. Various components of the application deployment system 110 may run on various computer systems, such as the computer system 2000 shown in further detail in FIG. 9 below, in some embodiments.

In some embodiments, the application deployment system 110 may provide services to various clients 105 connected over a network 102.

A client 105 may request to load an application 120 from the application deployment system 110, in some embodiments. This request may be submitted through a user agent 106. In some embodiments, the agent may be entirely implemented on the client side 107 of the network 102 while in other embodiments the agent may be entirely, or in part, implemented on the server side 108 of the network 102.

Responsive to the load request, the agent may then determine if a refined client manifest 124 associated with the client 105 exists within a set of manifests 140 for the requested application 120. If a refined client manifest 124 does not exist, the agent may create, or cause to create, a refined client manifest 124 using information contained in the application manifest 122, in some embodiments. Application manifest 122 may contain library criteria 123 for a number of code libraries 130. These code libraries 130 may contain independent units of application functionality and may, in some embodiments, contain executable code. In other embodiments, the libraries 130 may contain code suitable for binding with other executable code, may contain source code or executable scripts, etc. For example, in some embodiments the libraries 130 may contain JavaScript or TypeScript code or other executable script code suitable for implementing web-based applications while in other embodiments the libraries may contain precompiled code, such as Java bytecode or native executable code. In still other embodiments, the libraries 130 may contain source code suitable for compilation to generate the application 120. The examples are not intended to be limiting and any number of forms of code libraries may be envisioned. Furthermore, it should be understood that different libraries may contain different types of application code.

The library criteria 123 may include an identifier of the particular library 130 and may optionally include version information identifying particular version(s) of the library code required. Other information useful to identify the library 130 or to incorporate the library 130 into the application 120 may be further included and the above examples of library criteria 123 are not intended to be limiting.

The application manifest 122 may further include definitions for multiple versions of the application 120. These different versions may include differing version information identifying particular version(s) of library code required or may identify different libraries. For example, an application manifest 122 may include a definition for a stable or release version of the application as well as one or more development and testing versions of the application. In another example, an application may include differing versions adapted to the requirements of particular users. These examples are not intended to be limiting and different versions of an application may be defined in the application manifest 123 for any number of reasons.

The agent may use the library criteria 123 along with cell selection criteria 134 and cell identifiers 133 of respective library manifests 132 to select, among a number of library cells 135, a particular library cell suitable for use in generating the application 120, in some embodiments. These various library cells 136 may contain different versions of the library 136, in some embodiments, and development and deployment of these libraries may occur independently of and asynchronously to development and deployment of the application 120, in some embodiments.

The cell selection criteria 134 of individual libraries may be specified by the library packagers to control deployment of the respective libraries into various ones of applications 120, in some embodiments. A library may be deployed to any number of library cells 135, with the same or different versions of the library deployed to individual cells. The cell selection criteria 134 may include weightings for respective cells to control utilization of individual cells in the library 130.

For example, a library may employ three cells, with the first cell configured to provide the library to eighty percent of users, the second cell configured to provide the library to twenty percent of users and a third cell configured to provide the library to zero percent of users. In this example, a stable release of the library may be deployed in the first cell while a new release of the library is deployed in the second cell, with the weighting limiting the usage of the new release to mitigate potential harms of new library code, in some embodiments. In this example, the third cell may be used for developmental or experimental versions of a library, in some embodiments. While no users will be configured to use this version in the third cell, an individual user may configure an override of a cell selection in the refined manifest 124 as part of deployment testing. The above example of cell configuration and cell selection criteria is but one of many possible examples and it should be understood that any number of cells may be configured for a library, supporting any number of versions and using any number of cell selection criteria, and the above example is not intended to be limiting.

Once cells for all respective libraries 130 have been selected, the agent may create the refined manifest 124 for the client 105. To ensure that the client 105 receives a consistent view of the application 120 upon reload, the agent may compute an evenly distributed numeric hash of a pseudo-random value assigned to the user and the library identifiers of the application 120 to create a durable mapping of created refined manifest 124 to the client 105. In this way, the client 105 will receive the same version of the application 120 on subsequent reloads unless or until an update to a selected library cell occurs. Other clients 105 will receive a similar stable view of the application 120, although different clients 105 may receive different versions of the application 120 depending on the versions of the various libraries 130 selected, in some embodiments.

The agent may then use the identified, or newly created, refined manifest 124 to generate the application 120. The various libraries 130 may provide code entry-points conforming to known library interfaces, in some embodiments. The agent may use the provided code entry-points of the various libraries to resolve code references between the various libraries to create the application 120. For example, a web application 120 may be generated using JavaScript or TypeScript code libraries 130 by an agent implemented as a client-side agent 106 script downloaded to the client as part of the request to load the application. This client-side agent 106 script may then access the various libraries 130 according to the refined manifest 124 and create the refined manifest should it be determined that no refined manifest for the client 105 exists. The client-side agent 106 script may then download the various libraries 130 and resolve code references between the various libraries to create the application 120. In other embodiments, the agent may be implemented, at least in part, as a server-side component and may additionally include compilation and linkage steps as required for the code types present in the libraries 130. These examples are not intended to be limiting, and any number of implementations to resolve code references between the various libraries may be envisioned.

Please note, FIG. 1 is provided as a logical illustration of decentralized application development and deployment and is not intended to be limiting as to the physical arrangement, size, or number of components, modules, or devices to implement such features.

The specification first describes an example network-based application development and delivery service that performs decentralized application development and deployment. Included in the description of the example network-based application development and delivery service are various aspects of the example network-based application development and delivery service. The specification then describes flowcharts of various embodiments of methods for decentralized application development and deployment. Next, the specification describes an example system that may implement the disclosed techniques. Various examples are provided throughout the specification.

Figure 2:
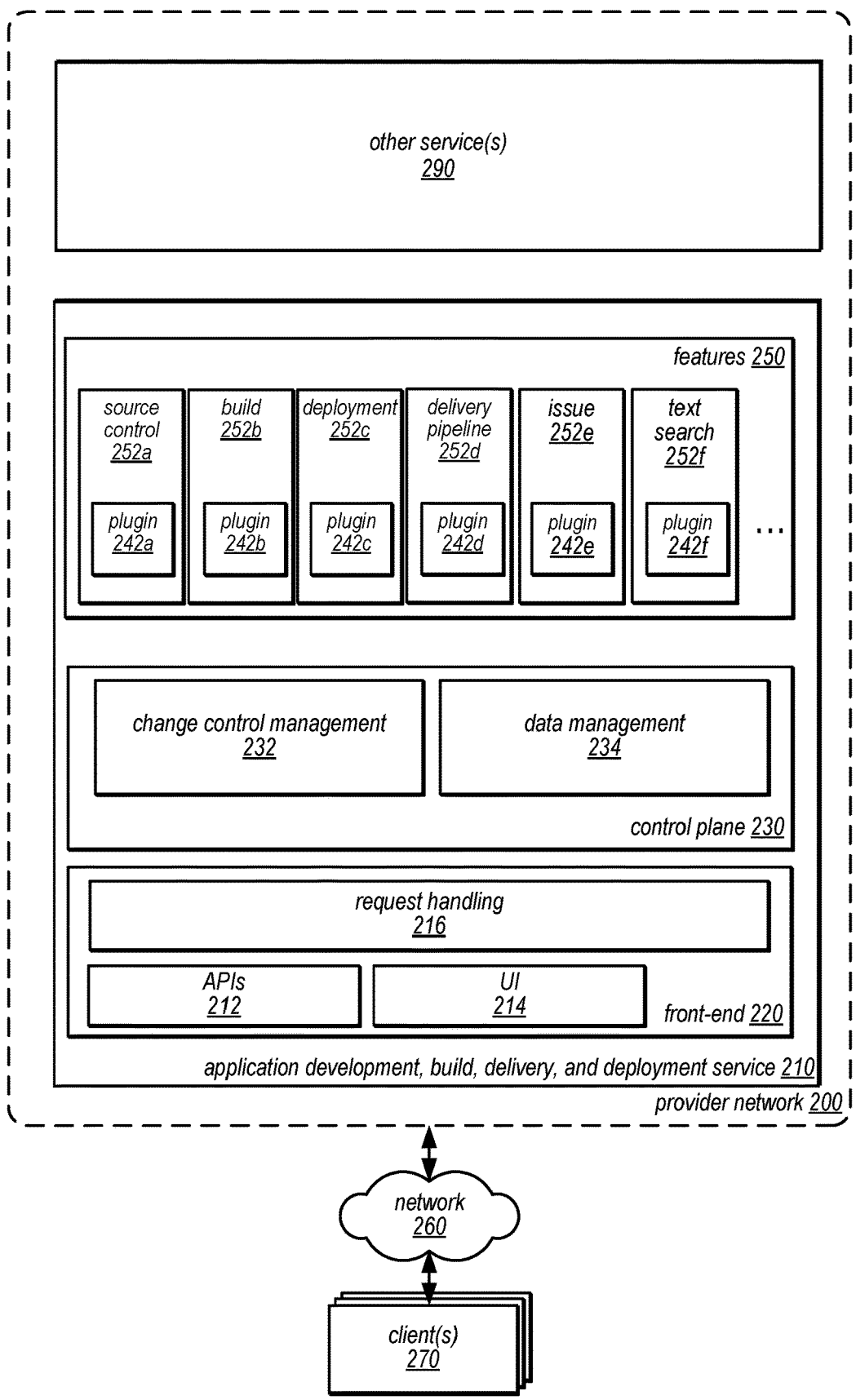
FIG. 2 is a block diagram illustrating a provider network that may implement an application development, build, deployment, and delivery service that implements decentralized application development and deployment, according to some embodiments.

FIG. 2 is a block diagram illustrating a provider network that may implement extensible, change control management, according to some embodiments. Provider network 200 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as computation and storage hosts, control plane components as well as external networks, such as network (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients, such as clients 105 in FIG. 1, may be attached to the overlay network so that when a client 105 provides an IP address that they want to send packets to, the IP address is run in virtual space by communicating with a mapping service that knows where the IP overlay addresses are.

Provider network 200 may implement many services, such as other services 290 that provide various types of computing, storage, management, network, or other services. As discussed in detail with regard to FIGS. 2-6, provider network 200 may implement application development, build, delivery, and deployment service 210 that enables developers to plan, write, test, and deliver software as part of a team or engineering organization. Various features of application development, build, delivery, and deployment service 210 may enable more developers to deliver efficiently, safely, and quickly. Application development, build, delivery, and deployment service 210 may offer various tools and capabilities (as well as allowing developers to add, adapt or implement further tools) that developers need to accomplish their tasks. As developers continue to use the tools of application development, build, delivery, and deployment service 210, various features may support the integration of development projects with an developing organization's standards, expanding the usage to more and more teams of the organization. Application development, build, delivery, and deployment service 210 may, in some embodiments, provide a web client that lives outside provider network 200's management console, a developer identity and authorization system that supports both individual and workforce identities, and an end-to-end developer toolchain that improves on existing solutions in terms of breadth and by making it easy for developers to successfully achieve software development velocity and quality at scale due to the extensibility and scalability offered by system features such as change control management 232 and data management 234.

Application development, build, delivery, and deployment service 210 may utilize various tools and other services as building blocks to provide core functionality and a web UI to deliver a unified end-to-end experience. Some features of application development, build, delivery, and deployment service 210 will allow developers to centralize management of their software development projects, including access control, easy implementation of software development life cycle (SDLC) best practices, auditing, and software provenance tracking. The set of capabilities provided by these features may include the ability to execute workflows, define and enforce best practices, and track compliance.

Application development, build, delivery, and deployment service 210 may provide centralized data management and change control systems, which may standardize and simplify how data is shared between systems owned by different teams. This should allow the overall experience to feel more unified regardless of our organization's structure, while also simplifying the implementation of features that were historically difficult to build, such as a "track changes" view with near-real-time updates from across the toolchain, or a personalized activity dashboard that spans product areas.

Application development, build, delivery, and deployment service 210 may use a set of tools (e.g., different services) or other features that can act as or utilize respective plugins developed and operated by for the different tools (e.g., source, artifacts, build, test, deploy, issues). The plugins may integrate may integrate with the tools to expose their functionality to end users. The platform services include a web UI 214 framework based on a micro-frontend architecture and a shared API layer. Application development, build, delivery, and deployment service 210 a data management system to facilitate data sharing across tools— and change control management that standardizes the way users perform mutating actions in application development, build, delivery, and deployment service 210.

Application development, build, delivery, and deployment service 210 may implement interface 220 which may include various features for interacting including Application Programming Interfaces (APIs) 212 and a User Interface. For example, APIs 212 may be implemented as a Software Development Kit (SDK) which may include operations to create, read, update, and/or delete various documents which are authored as part of Application development, build, delivery, and deployment service 210. User interface (UI) may be a web, or other graphically based, development environment that allows for various features, including leveraging a micro-front-end framework for packaging and routing client-side applications Text searches, as well as updates that cause index updates may be received or performed through APIs 212 and/or other user interfaces of application development, build, delivery, and deployment service 210.

Control plane 230 may be implemented as part of application development, build, delivery, and deployment service 210 and may include change control management 232 and data set management 234. Data set management 234 may accept data from data providers, manage schemas for the data, manage subscriptions for data consumers and store non-authoritative copies of the data, as discussed in detail below with regard to FIG. 3. Change control management 232 may manage potential changes that can be pre-evaluated, mediate between change approvers, and change performers, and maintain an authoritative reference to the desired state of each resource under its governance, as discussed in detail below with regard to FIG. 4.

As noted earlier, plugins may include plugins 242a, 242b, 242c, 242d and 242e, which may bused to access various development tools, such as features 250, including but not limited to source control 252a, build 252b, deployment 252c, delivery pipeline 252d, issue handling 252e, and text search 252f, which is discussed in detail below with regard to FIGS. 5-8. Plugins may include web service APIs for change control management 232 and data set management 234 as well as callbacks (similar to webhooks) invoked by those components. Plugins can run on their own infrastructure, and can use whatever technologies wanted to develop plugins; plugins can run on various execution resources in provider network 200 (e.g., various compute or other services). Plugin authors will be able to use generated clients to call change control management 232 and data set management 234 APIs, and for first-party plugins they will be able to use an authorization service to authenticate directly to these systems. At the same time, change control management 232 will pass along the details of the authenticated end user to plugins when changes are requested. Plugin responsibilities may be defined in terms of what document schemas they work with; they may consume some schemas, produce others, and enact changes for the documents they claim responsibility for. Plugins may use registration APIs to indicate which schemas they handle or subscribe to, as discussed below with regard to FIG. 3. This model allows significant flexibility for adding or improving tools, while keeping a consistent experience and facilitating cross-cutting features like governance and data sharing.

Application development, build, delivery, and deployment service 210 may provide a unified end-to-end developer toolchain with governance controls that enable organizations to empower their development teams to deliver software to production with confidence. In order to implement useful governance controls, change control management 232 and data management 234 may allow application development, build, delivery, and deployment service 210 to process information from the end-to-end toolchain in order to present actionable insights to end users as well as make automated decisions about changes according to user-configured policies. As each tool may be completely independent and manages its own data implementing change control management 232 and data management 234 may support combining information from across different tools without disrupting the roadmaps or API designs of the individual tool developers that provide the authoritative data.

Change control management 232 may provide a centralized system to orchestrate policy evaluation and change enactment. Each tool 250 may have its own APIs for enacting changes, with varying styles and capabilities (e.g., put vs. update APIs, declarative vs. imperative models, divergent capabilities for injecting approval requirements, etc.). Change control management 232 may provide a common way to access toolchain data to aid integrations into development, build, delivery, and deployment service 210 and a single place to contribute their own data. Change control management 232 allows for a interface to gain influence over the entire toolchain (subject to customer-defined rules and authorization, in some scenarios).

In some embodiments, clients of change control management 232 and data management 234 (aside from these two systems themselves) may be considered a plugin (e.g., various features 250). A plugin may be a component that is doing some combination of producing data, consuming data, enacting, approving, or requesting changes. For example, an interface, such as UI 214 may be plugin (although illustrated separately in FIG. 2). For example, it produces data about end user activity, consumes data from many other plugins, and requests changes on behalf of the end user. There could also be an aggregator system plugin that uses a tool like Apache Flink to consume data, process it, and produce aggregations to power browse experiences in the UI 214 or to precompute key metrics for display in an integrated development environment (IDE) or use in other plugins. In various embodiments, plugins may not interact directly with one another and can produce data under shared schemas that can be consumed without needing to depend on a specific implementation. For example, there could be a common schema for a document that describes the new commits being added in a pull request; a UI 214 that visualizes this information would not need to produce a separate implementation for each source control tools supported in application development, build, delivery, and deployment service 210. In other scenarios, proprietary schemas for scenarios with differentiated features can also be implemented.

In various embodiments, control plane 230 may be implemented as a document-oriented control plane to expose the user-configurable parts of the toolchain and to expose data about the resources in the system. As noted above, application development, build, delivery, and deployment service 210 may have a unified front end control plane layer that handles both read and write requests. In the front end, read requests may be forwarded to data management 234 (or to indexes populated from data management 234). Write requests may be accomplished through a "requestChange( )" API, where the caller passes the ID and requested content of a document supported by the system. The change can be evaluated by an extensible set of plugins before being committed, and a variety of provider plugins implemented by product area teams can enact the requested change once it is approved.

A document-oriented control plane 230 helps application development, build, delivery, and deployment service 210 provide a uniform layer where aggregations, provenance tracking, and comprehensive governance controls can be implemented in a consistent and highly generalized way. Developers of a tool 250 can define their resource configurations and data in terms of document schemas, and then the work of aggregating, tracking, or governing these documents can be done by a different tool 250 with minimal coordination after the schema has been established. Additionally, application development, build, delivery, and deployment service 210 may be extensible to meet user needs over the long term; the document schemas provide a natural extension point, because any plugin that produces the required documents or can enact changes using a common schema can be used. For example, given a common set of schemas for source control documents, users could use a built-in source control system or a source control system offered by a different organization or provider (e.g., different from provider network 200 and application development, build, delivery, and deployment service 210) with zero or minimal impact to the rest of the experience.

As noted above, application development, build, delivery, and deployment service 210 uses data management 234 to be a central data management system to allow different tools to share data with one another. Data management 234 may implement a publish/subscribe model, where some plugins write new document versions or events and other plugins can consume them. Data management 234 may implement a subscription system that supports subscriptions to a single document, a document type/schema, or to a grouping of documents (e.g., which may be called a partition). Data management 234 may introduce the concept of partitions to allow document updates to be ordered within a document group; for example, this can be leveraged to build a provenance tracking system where consumers of provenance tracking data will be able to depend on referential integrity within a partition because the publisher has ordered documents in an order where (for example) document creation events come before references to the created document. In addition to provenance tracking, the publish/subscribe system may be used to implement near-real-time aggregation and to populate search indexes and other specialized query engines (such as a graph database).

Data management 234 may not need to contain all data in application development, build, delivery, and deployment service 210 to support the various features discussed above. At the same time, it may have enough data that new projects to produce aggregations or that need to trigger off events coming from the toolchain will be able to satisfy most of their needs from existing documents in data management 234. There may be no firm requirements, in some embodiments, about what data is to be maintained in data management 234, as opposed to being made available through pass-through APIs to tools 250 or other data sources (e.g., data stored in other service(s) 290).

As noted above, control plane 230 that implements features like change control management 232 and data management 234 may provide an extensible and adaptable application development, build, delivery, and deployment service 210. For example, if it were desirable to add a new feature, such as new tool 250 to application development, build, delivery, and deployment service 210, such as a "track changes" feature that allows users to find out where a change is in their continuous delivery (CD) pipeline with integrated context from across the toolchain, the user experience may be designed first. This user experience may might include the presentation of some information and a navigation structure. Then, the API contract between the client and application development, build, delivery, and deployment service 210 (e.g., in a user interface implemented on a client 270, this could be the API that JavaScript would use to get data and push notifications). In the case of track changes, the API would return data with a given schema designed to support the needs of the user experience. This schema could be registered in data management 234.

Next, development of the track changes feature can be made based on example data pushed to data management 234 following this schema. In parallel, an aggregation process can be designed. For track changes, there may need to be some new data produced by the existing feature plugins (e.g. populating a missing identifier) as well as a new aggregation pipeline to take all the data from feature plugins and join them together into a document in the form required by the user experience. These changes can be made in parallel to each feature plugin, and the aggregation can be done as a new analytics application in an analytics service plugin. For each plugin, the process of integrating with data management 214 may be the same: first, the plugin can register a new schema version describing the additional data that would be sent. Then, the plugin can consume new versions of schemas from their dependencies. Finally, a new schema version can be produced—in the case of a backwards-incompatible update, this might be a fork of the code for the new tool so that both versions are produced. Data management 234 can ensure that consumers are able to quickly get updates from producers so that the aggregated view can be a near-real-time representation of what is happening in the underlying tools. Finally, the user interface can migrate from its test data set to the real data coming from the aggregation pipeline.

In another example, an update to an existing feature can be made using the extensibility and adaptability provided by control plane 230. For example, if minor update (from a customer experience perspective) were to be made to an existing feature plugin, then new data may need to be provided from the plugin to the client. The process of working with data management 234 can be identical to what goes on for a new feature; working backwards from user experience, any data aggregation layers that are needed may be designed, and new schema versions for the feature plugin may be added. However, in some cases generalizable client schema traits can be used further shorten the development process for the update. For example, a new text field input is added to a project, traits in the schema could allow each layer (the aggregation as well as the client plugins) to add user interface treatments to most attributes of the project generically. In some cases, the feature plugin may be able to add a backwards-compatible update with an appropriately decorated schema and have the new information show up in the UI 214 without any work on other tools 250.

Data producers write data to data set management 234, either in the form of an event stream or a set of documents that the producers update over time, in some embodiments. Data producers advertise schemas to which the data they publish is expected (and enforced) to conform. Data consumers can subscribe to events or document updates and retrieve data from data management 234, relying upon a feature of data set management 234 that will return data that's valid according to the advertised schema. Plugins can be both producers and consumers, but in some scenarios not for the same data. For example, text search 252f may be a subscriber to various documents events that add, delete, or modify documents in order to make corresponding updates to inverted indexes.

Figure 3:
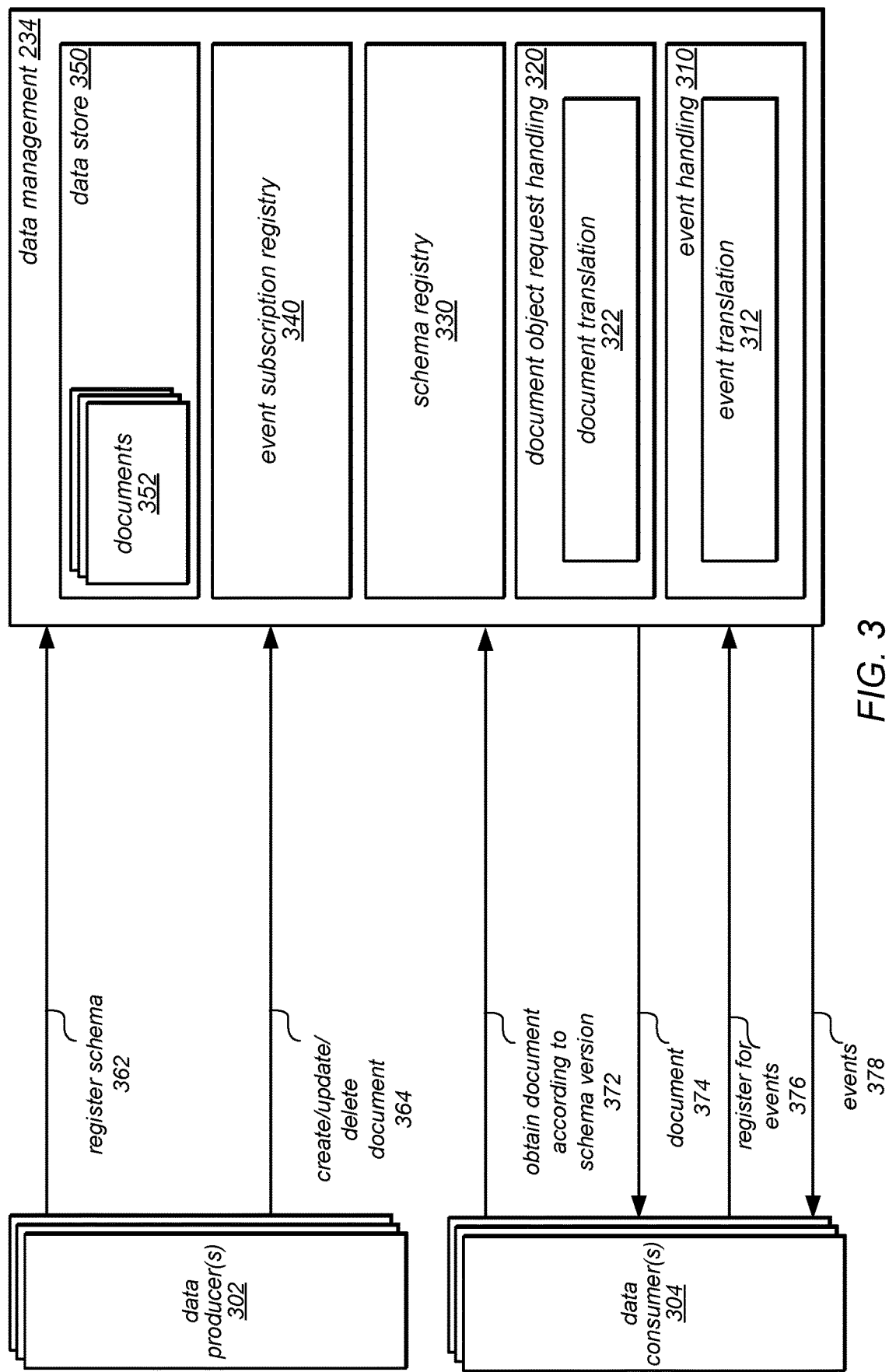
FIG. 3 is a block diagram illustrating data set management, according to some embodiments.

FIG. 3 is a block diagram illustrating an example data management system for the application development, build, deployment, and delivery service, according to some embodiments. Data management 234 may implement different types of request handling. Event handling 310 may perform event translation as part of handling different events, as discussed in detail below with regard to FIG. 6. Document object request handling 320 may perform document translation 322 as part of handling different document object requests.

For example, document object request handling 320 may receive document update requests, such as update request (e.g., to create, modify, or delete a document object). Document object request handling 320 may send a request to get applicable schema version(s) from schema registry 330. Schema registry 330 may identify the applicable schema versions (e.g., from mapping information) or may identify them from identifiers in the request. Schema registry may return the schema version(s) to document object request handling. Document object request handling 320 may use the schemas to determine the update fails to satisfy the schema(s), such as failing to satisfy a current version of the schema. If so, then a rejection of the update as invalid may be sent. Document object request handling 320 may then send a request to data store 350 to update the document according to the request. Document object request handling 320 may also send a notification of an update document event to event handling 310.

Similar techniques to those depicted with regard to document update can be performed to create a new document. For example, a create document request can be received at document object request handling 320, which include information, such as a file (or location thereof), or other information used to create the document. Again, document object request handling 320 may get applicable schema version(s) 320 so that document object request handling 320 can determine which schema version to apply to create the document. For example, the document may one of many documents that are created according to the same schema. Which schema version is applied may correspond to which plugin (e.g., which tool or other feature) submitted the document creation request. Mapping information may, for example, be used to determine which schema version is applicable to which requestor. In some embodiments, the request itself may specify the schema version. Document object request handling 320 may then store the document to data store 350. An event may be triggered or sent to event handling 310.

Schema registry 330 may provide storage for different schema versions, translation instructions and other schema information. A request to register a schema 362 may be received. For example, an interface of a data management system, like data management system 110 or 234, may support registration requests (e.g., via API, graphical user interface, command line interface, and so on), in order to provide a new version of a schema (e.g., specified as a JSON or other script, programming code, or language) with an associated data object (e.g., a document or event stream). In some embodiments, the schema may include or link to instructions (e.g., scripts, programming code, or language) for translating between the version of the schema being registered and one or more prior versions of the schema (e.g., describing what data field was added, changed, removed, etc.).

The registration request may be rejected, in some embodiments, if the request or updated schema fails a validation technique, such as analysis indicating that the version of the schema fails to conform to various stylistic or other constraints on schemas (e.g., using invalid data types). A response indicating that the registered version of the schema is invalid may be returned.

The version of the schema may be added to a registry 330 for schemas for data objects, in some embodiments. For example, a database or other data storage system may store a schema as a document, file, or other object. A link, mapping, or other association may be updated to identify which data object(s) (e.g., event stream or document) the schema is applicable to (e.g., a version number, a schema identifier and data object identifiers).

Event subscription registry 340 may support storage for data consumers to register for events. Data store 350 may store data for data objects, such as documents 352 and event streams (not illustrated).

Data producers may submit various requests, including registering a schema 362, creating, updating, or deleting a document, as indicated at 364, creating an event stream, or submitting events. For example, data consumers may submit various requests and receive various responses, including requests to obtain a document according to a schema version, as indicated at 372, receive the document 374, register for events, as indicated at 376, and receive events, as indicated at 378. For example, document object request handling 320 may handle requests to obtain documents. Document object request handling 320 may get the applicable schema versions from schema registry 330. Document object request handling 320 may also get the document from data store 350. If translation should be performed, then translation instructions may be used and the document sent to the data consumer 304.

Similarly, in another example, events may be received either from their submission to data management 234 as part of an event stream or as an event related to a document update or creation (as noted above). Event handling 310 may send a request to get applicable schema(s) for the event to schema registry 330. Schema registry may identify the applicable schemas (e.g., based on mapping information) or may return those schema(s) identified in the request (e.g., by version and schema identifier). The schemas may be returned.

Event handling 310 may use the schemas to evaluate the validity of the event. If the event does not satisfy the schema(s), then it may be rejected, as indicated at 607. If valid, event handling 310 may send a request to event subscription registry to get 609 subscribers for the event (e.g., subscribers to an event stream or document). Event subscription registry 340 may return the subscribers. Event handling 310 may determine, based on the subscribers, whether translation should be performed (e.g., does an event subscription have a schema version identifier matching the event, or an earlier schema). If translation should not be performed, then the event is sent. If translation should be performed, then translation may be performed using translation instructions between schemas and the translated event sent.

Figure 4:
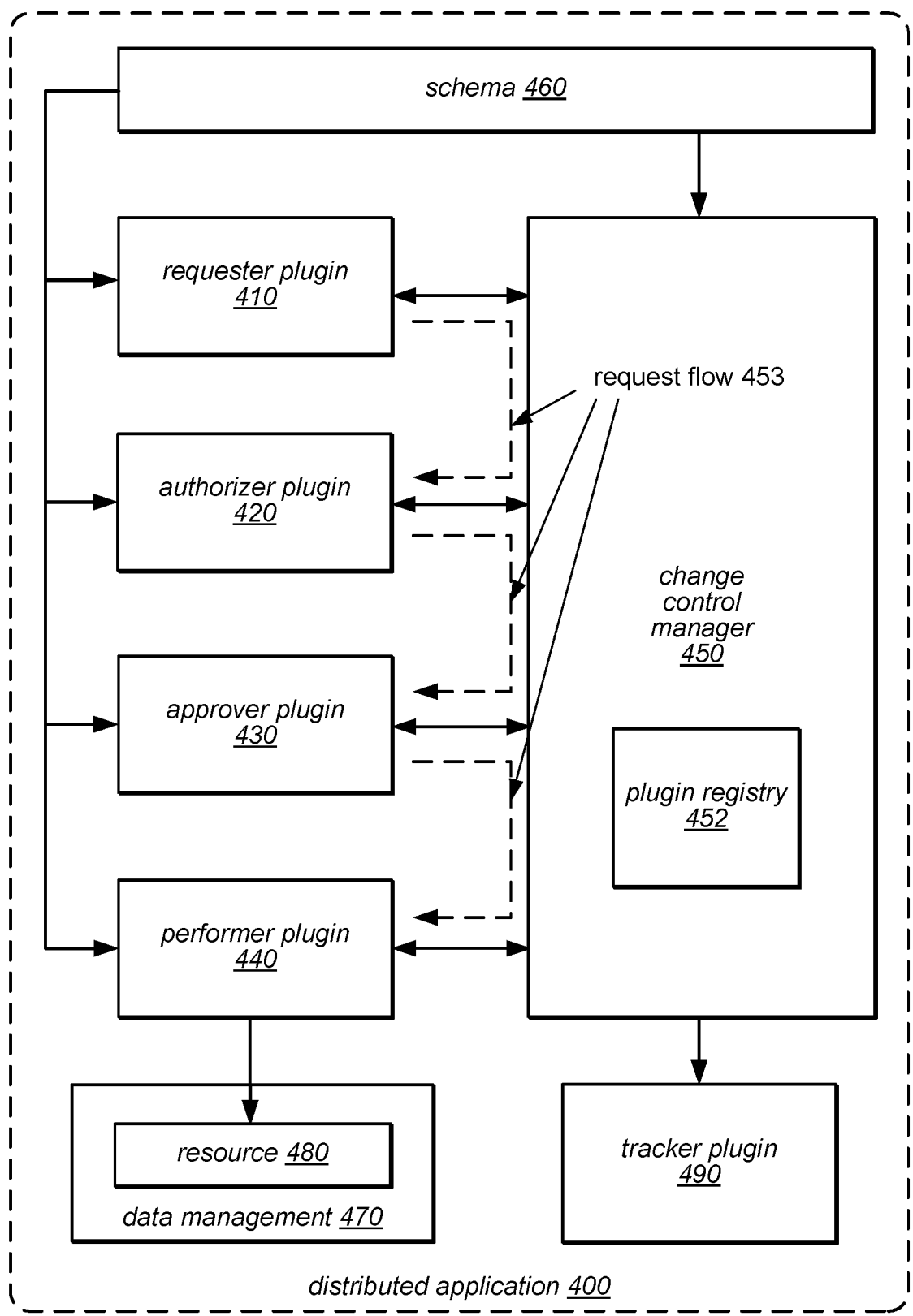
FIG. 4 is a block diagram illustrating change control management, according to some embodiments.

FIG. 4 is a block diagram illustrating extensible change control management, according to some embodiments. Distributed application 400, such as an application that utilizes various plugin components to integrate, support, and extend the capabilities of the distributed application 400, may include a change control manager 450 which may implement changes to a resource 480 stored in data management 470 using various plugins 410, 420, 430 and 440, in some embodiments, identified in plugin registry 452. Plugin registry 452 may be a registry for a single resource (or organized to group registered plugins by resource) in a data structure (e.g., table, index, etc.). The resource 480 may be of a particular resource type, with the resource type having an associated schema 460. Various change operations for the resource 480 may be encoded using the schema 460, and the various plugins 410, 420, 430 and 440 as well as the change control manager 450 may access the schema 160 during communication of these operations.

A requester plugin 410 may submit requests for changes to the resource to change control manager 450. These requests for changes may follow a typical request flow 453. These requesters may, in some embodiments, provide various user interfaces (UIs) or Application Programming Interfaces (APIs) or other programmatic interfaces to allow users to submit change requests to the change control manager. In other embodiments, a requester plugin may perform other plugin roles for the resource of for other resources and may submit change requests as part of fulfilling other plugin roles. These examples, however, are not intended to be limiting, and any number of requester plugin implementations may be envisioned.

An authorizer plugin 420 may authorize or reject change requests submitted to the change control manager 450 by requester plugins. An approver plugin 430 may approve or reject change requests submitted to the change control manager 450 by requester plugins. A given resource may have any number of registered approver plugins in plugin registry 452, in various embodiments.

A performer plugin 440 may perform approved change requests submitted to the change control manager 450 by requester plugins. In some embodiments, a plugin may implement more than one plugin function for a resource or the same or different plugin functions for different resources. For example, in some embodiments, a plugin may implement both an approver plugin function as well as a performer plugin function for a resource, as discussed below. It should be understood, however, that some combinations of plugin functions may not be allowed, for example, a plugin implementing both a requester function and an approver function for the same resource. These examples, however, are not intended to be limiting and any number of plugin implementations may be imagined.

In addition, a tracking plugin 490 may receiving notifications of various events associated with the resource 480. A change performer plugin component 440 may advertise possible changes and reference the projected consequences to a resource 480 stored within data management 470.

For example, a performer plugin 430 may advertise a change to merge a pull request with the consequence that the tip of the destination branch will change. Change approver plugin 430 may be required to record approval in change control manager 450 before a change can proceed. For example, if it is desirable to use an advisory time window plugin, that plugin would have to approve changes to deployed environments before they are enacted—a time window plugin would reject changes that take place during an advisory period. Change approver plugins 430 can pre-approve a change where applicable. For example, when evaluating whether a user can merge a pull request, in most cases it is not necessary to wait for a user to actually request the merge to determine if it is allowed. Change requester plugin 410 may start the process of enacting a change.

These requester plugins could be client plugins that provide user interfaces (UIs) that make these requests on behalf of end users but they could also be feature plugins. For example, a delivery pipeline plugin (e.g., plugin 242d as shown below in FIG. 2) could be a change requester 410 and initiate changes to each target resource according to its orchestration rules instead of directly performing these changes itself. Finally, change performers 440 complete the process by enacting approved changes and recording the results in change control manager 160 and data management 470. Plugins may perform combinations of these roles, but it may be rare, in some scenarios, for a plugin to perform multiple roles for the same type of change—for example, it is not expected that a plugin will be an approver for its own changes.

Figure 5:
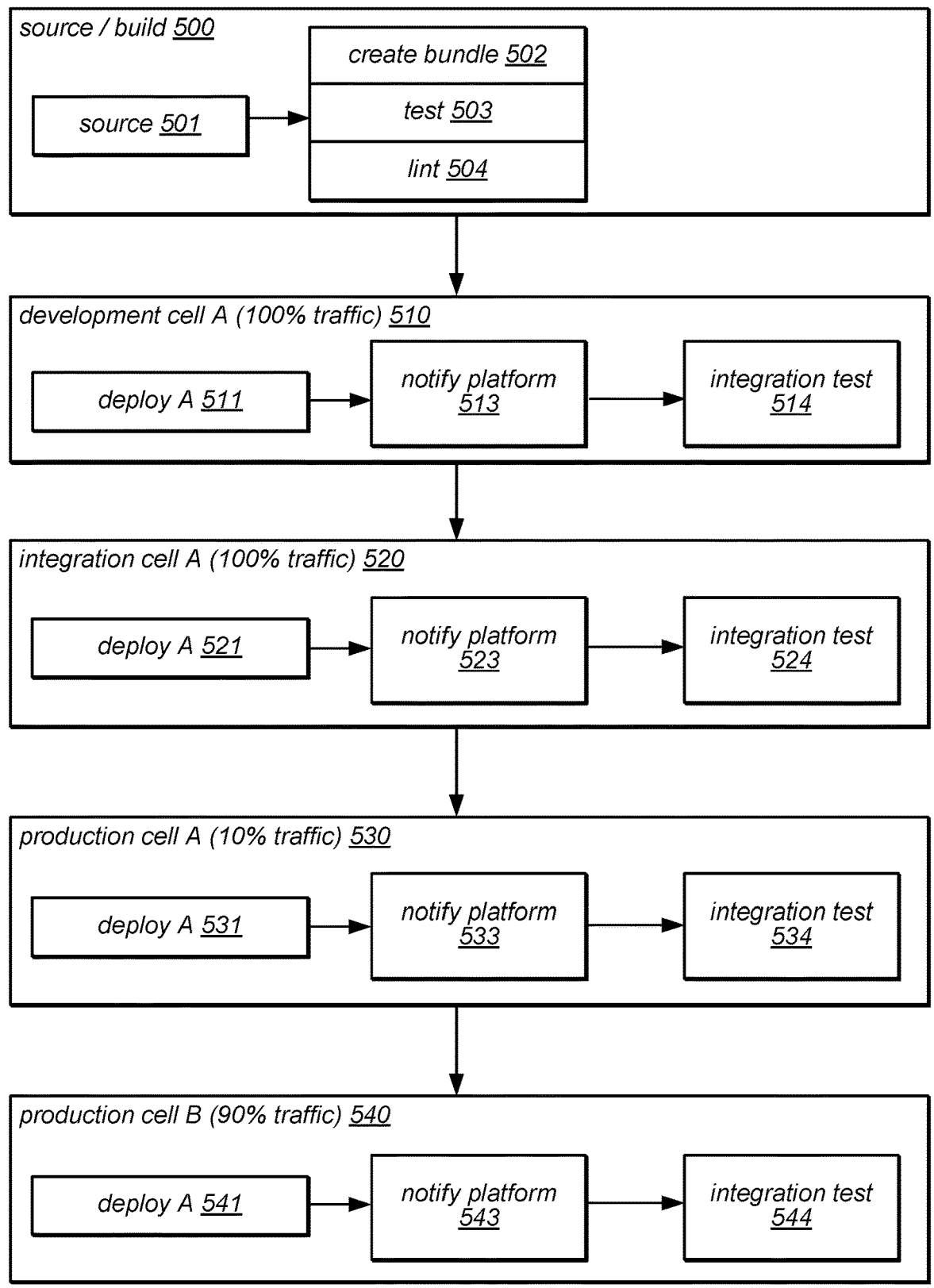
FIG. 5 is a block diagram illustrating a process flow of application development and deployment, according to some embodiments.

FIG. 5 is a block diagram illustrating a process flow of application development and deployment, according to some embodiments. Client-side application packaging in and routing 252e discussed above with regard to FIG. 2, as well as application deployment system 110 in FIG. 1 may implement such a process flow. An application or portion of an application, such as a code library, for example the application 120 or libraries 130 as shown in FIG. 1, may proceed through a series of phases during development and deployment, in some embodiments. At an initial phase, as shown in the source/build phase 500, source code 501 may be used to create an application bundle using a variety of techniques such as integrating, compiling, linking, etc., in some embodiments. This application bundle may then be used for initial testing 503 as well as code analysis, such as with the lint program 504.

After initial testing, the development and deployment process may the proceed in some embodiments to a development cell A 510 where the application may be deployed 511, the application platform notified of the deployment 513, and integration tests performed 514. In this illustration, all (one hundred percent) of development traffic may be handled by development cell A, in some embodiments.

After the application has passed development testing, the development and deployment process may the proceed in some embodiments to an integration cell A 520 where the application may be deployed at cell A, as shown in 521, the application platform notified of the deployment 523, and integration tests performed 524. In this illustration, all (one hundred percent) of integration test traffic may be handled by integration cell A, in some embodiments.

After the application has passed integration testing, the development and deployment process may the proceed in some embodiments to an initial production cell A 530 where the application may be deployed at cell A, as shown in 531, the application platform notified of the deployment 533, and integration tests performed 534. In this illustration, only ten percent of production traffic may be handled by production cell A, in some embodiments.

After the application has passed initial production testing, the development and deployment process may the proceed in some embodiments to a full production deployment at production cell B 540 where the application may be deployed at cell Bl, as shown in 541, the application platform notified of the deployment 543, and integration tests performed 544. In this illustration, ninety percent of production traffic may be handled by production cell A, in some embodiments.

The application build, development, delivery, and deployment service discussed in FIGS. 2 through 5 provide examples of a deployment system that may implement decentralized development and deployment for applications. However, various other types of deployment or development systems may implement such techniques.

Figure 6:
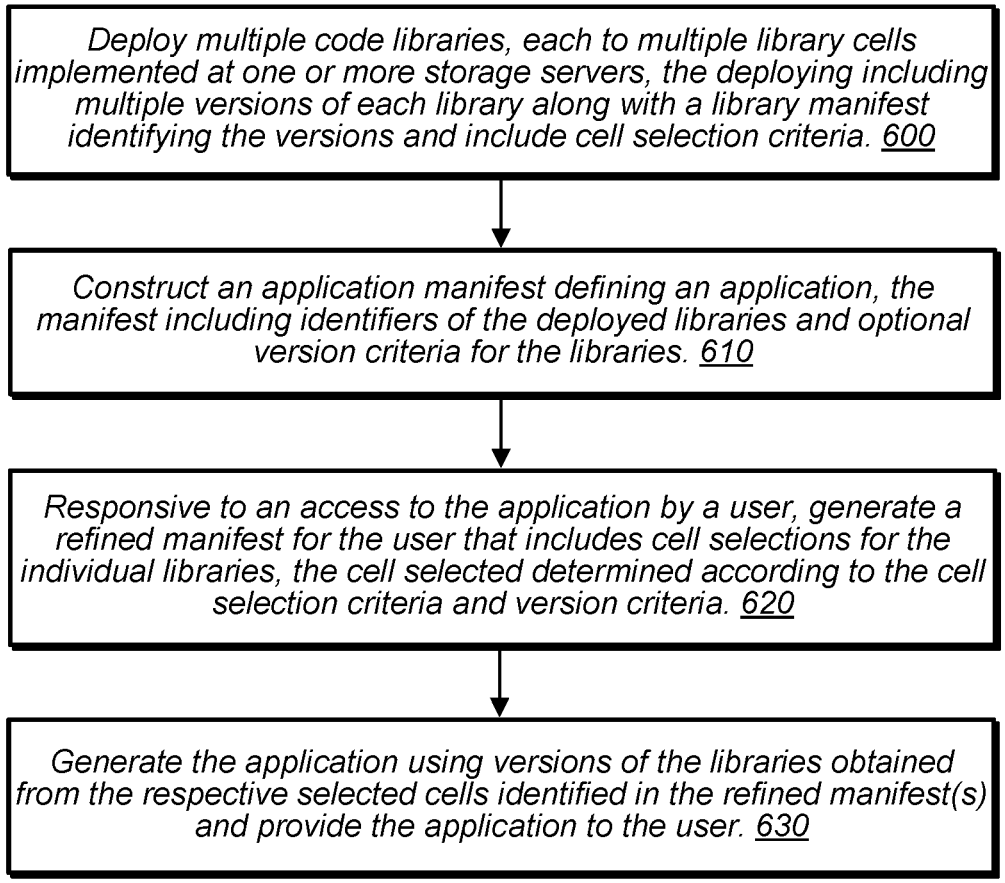
FIG. 6 is a flow diagram illustrating decentralized application deployment and initial loading, according to some embodiments.

FIG. 6 is a flow diagram illustrating decentralized application deployment and initial loading, according to some embodiments. Various different systems and devices may implement the various methods and techniques described below, either singly or working together. For example, an application build, development, delivery, and deployment service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

The process begins at step 600 where multiple code libraries, such as the libraries 130 as shown in FIG. 1, collectively implementing an application, such as the application 120 as shown in FIG. 1, may be deployed, in some embodiments. Individual ones of the of the libraries may be deploy on multiple library cells, where difference cells of the library may contain different versions of the library. Deployment of individual libraries may include creation of a library manifest, such as the library manifest 132 as shown in FIG. 1, identifying the various library cells and their contained library versions, such as in the cell identifiers 133 as shown in FIG. 1, in some embodiments. The library may also contain cell selection criteria such as a cell weight or other dynamic selection mechanisms (e.g. conditional weighting driven by an AB testing system), such as cell selection criteria 134 as shown in FIG. 1, in some embodiments.

Individual code libraries may be deployed by different packagers separate from authors or packagers of applications based on those libraries. Library packagers may deploy different versions of the library into different library cells and the collective versions deployed into all library cells may define a set of available versions per-library, in some embodiments.

As shown in 610, the process may then construct an application manifest defining the deployment of the application, as shown in application manifest 122 of FIG. 1, in some embodiments. This manifest may include identifiers of multiple code libraries as well as specific version constraints for those libraries, for example in the library criteria 123 as shown in FIG. 1, in some embodiments. The application manifest may also define multiple versions of the application where different versions of the application may include differing version information identifying particular version (s) of library code required or may identify different libraries. For example, an application manifest may include a definition for a stable or release version of the application as well as one or more development and testing versions of the application. In another example, an application may include differing versions adapted to the requirements of particular users. These examples are not intended to be limiting and different versions of an application may be defined in the application manifest for any number of reasons.

The process may then proceed to step 620 where, responsive to an access by a user or an agent of the application or a network page containing the application, or responsive to any other operation involving the application, a refined manifest, such as the refined manifest 124 as shown in FIG. 1, may be generated for the application associated with the particular access, user, agent. The generated manifest may include cell selections for the respective libraries, such as the library selections 125 as shown in FIG. 1, of the application where the cell selections are determined at least in part by cell selection criteria of the library manifests and version constraints of the application manifest, in some embodiments.

Additionally, the generated refined manifest may be associated with a requesting user or agent. Users or agents may be assigned pseudo-random values which may be used to deterministically identify particular cell selections contained in refined manifests for subsequent loads of the application. By computing an evenly distributed numeric hash of these pseudo-random values and each library identifier, a pseudo-random, but consistent, set of cell selections may be provided to the user or agent.

As shown in step 630, the application may then be generated by the agent using versions of the libraries obtained from the respective selected cells identified in the refined manifests. The various libraries may provide code entry-points conforming to known library interfaces, in some embodiments. The agent may use the provided code entry-points of the various libraries to resolve code references between the various libraries to create the application.

For example, a web application may be generated using JavaScript or TypeScript code libraries by a client-side agent, such as the client-side agent 106 as shown in FIG. 1, executing a script downloaded to the client as part of the request to load the application. This client-side agent script may then access the various libraries according to the refined manifest(s).

The client-side agent script may then download the various libraries and resolve code references between the various libraries to create the application. In other embodiments, the agent may be implemented, at least in part, as a server-side component and may additionally include compilation and linkage steps as required for the code types present in the libraries. These examples are not intended to be limiting, and any number of implementations to resolve code references between the various libraries may be envisioned.

Once the application has been generated according to the refined manifest(s), the application may be provided to the user via the agent, in some embodiments.

Figure 7:
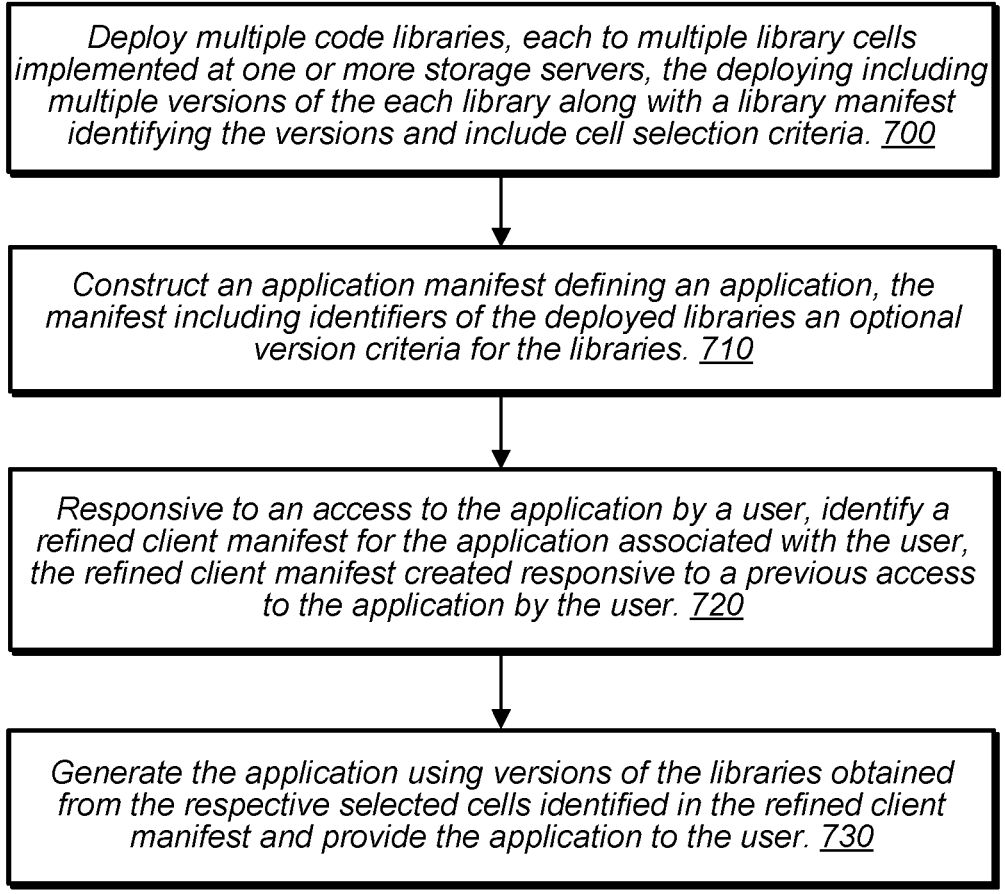
FIG. 7 is a flow diagram illustrating decentralized application deployment and repeated loading, according to some embodiments.

FIG. 7 is a flow diagram illustrating decentralized application deployment and repeated loading, according to some embodiments. The process begins at step 700 where multiple code libraries, such as the libraries 130 as shown in FIG. 1, collectively implementing an application, such as the application 120 as shown in FIG. 1, may be deployed, in some embodiments. Individual ones of the of the libraries may be deploy on multiple library cells, where difference cells of the library may contain different versions of the library. Deployment of individual libraries may include creation of a library manifest, such as the library manifest 132 as shown in FIG. 1, identifying the various library cells and their contained library versions, such as in the cell identifiers 133 as shown in FIG. 1, in some embodiments. The library may also contain cell selection criteria such as a cell weight or other dynamic selection mechanisms (e.g. conditional weighting driven by an AB testing system), such as cell selection criteria 134 as shown in FIG. 1, in some embodiments.

Individual code libraries may be deployed by different packagers separate from authors or packagers of applications based on those libraries. Library packagers may deploy different versions of the library into different library cells and the collective versions deployed into all library cells may define a set of available versions per-library, in some embodiments.

As shown in 710, the process may then construct an application manifest defining the deployment of the application, as shown in application manifest 122 of FIG. 1, in some embodiments. This manifest may include identifiers of multiple code libraries as well as specific version constraints for those libraries, for example in the library criteria 123 as shown in FIG. 1, in some embodiments. The application manifest may also define multiple versions of the application where different versions of the application may include differing version information identifying particular version(s) of library code required or may identify different libraries. For example, an application manifest may include a definition for a stable or release version of the application as well as one or more development and testing versions of the application. In another example, an application may include differing versions adapted to the requirements of particular users. These examples are not intended to be limiting and different versions of an application may be defined in the application manifest for any number of reasons.

The process may then proceed to step 720 where, responsive to an access by a user or agent of the application or a network page containing the application, or responsive to any other operation involving the application, a refined client manifest, such as the refined client manifest 124 as shown in FIG. 1, may be identified for the application associated with the user or agent, the manifest(s) including cell selections for the respective libraries, such as the library selections 125 as shown in FIG. 1, of the application, in some embodiments. This identified client manifest may be previously created responsive to a previous access to the application but the user or agent, in some embodiments.

As shown in step 730, the application may then be generated by the agent using versions of the libraries obtained from the respective selected cells identified in the refined manifests. The various libraries may provide code entry-points conforming to known library interfaces, in some embodiments. The agent may use the provided code entry-points of the various libraries to resolve code references between the various libraries to create the application.

For example, a web application may be generated using JavaScript or TypeScript code libraries by a client-side agent, such as the client-side agent 106 as shown in FIG. 1, executing a script downloaded to the client as part of the request to load the application. This client-side agent script may then access the various libraries according to the refined manifest(s).

The client-side agent script may then download the various libraries and resolve code references between the various libraries to create the application. In other embodiments, the agent may be implemented, at least in part, as a server-side component and may additionally include compilation and linkage steps as required for the code types present in the libraries. These examples are not intended to be limiting, and any number of implementations to resolve code references between the various libraries may be envisioned.

Once the application has been generated according to the refined manifest(s), the application may be provided to the user via the agent, in some embodiments.

Figure 8:
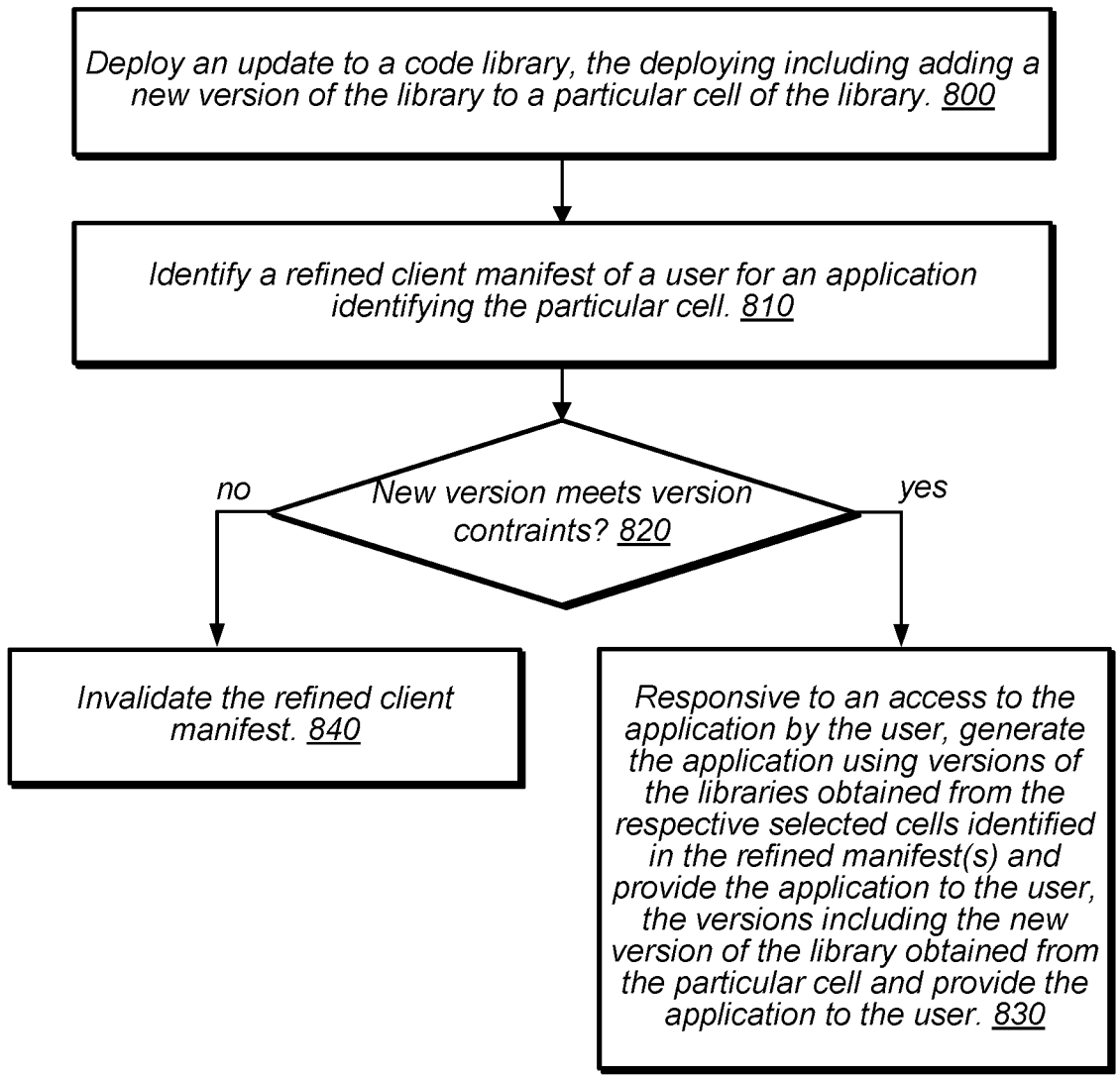
FIG. 8 is a flow diagram illustrating decentralized application updating, according to some embodiments.

FIG. 8 is a flow diagram illustrating decentralized application updating, according to some embodiments. The process begins at step 800 where a new version of a code library, such as the library 130 as shown in FIG. 1, using in an application, such as the application 120 as shown in FIG. 1, may be deployed, in some embodiments. The new version of the library may be deployed to a particular cell of the library, as determined by the packagers of the library, in some embodiments. In some embodiments, more than one version may be deployed to more than one particular cell, and the above example is merely a simple deployment technique and is not intended to be limiting.

The process may then proceed to step 810 where a refined client manifest, such as the refined manifest 124 as shown in FIG. 1, may be identified for an application associated with the user or agent, the manifest(s) including cell selections for the respective libraries, such as the library selections 125 as shown in FIG. 1, of the application, in some embodiments. These cell selections may include a selection of the particular cell containing the new version of the library, in some embodiments.

As shown in step 820, a determination may then be made whether the new version of the code library meets version constraints of the application, in some embodiments. If the new version of the code library does not meet version constraints of the application, as shown in a negative exit from 820, the identified refined client manifest may then be invalidated, as shown in 840, in some embodiments. If, however, the new version of the code library does meet version constraints of the application, as shown in a positive exit from 820, then responsive to an access by a user or agent of the application or a network page containing the application, or responsive to any other operation involving the application, the application may then be generated by the agent using versions of the libraries, as shown in 830, including the new version deployed in the particular cell, obtained from the respective selected cells identified in the refined manifests, in some embodiments. The various libraries may provide code entry-points conforming to known library interfaces, in some embodiments. The agent may use the provided code entry-points of the various libraries to resolve code references between the various libraries to create the application.

For example, a web application may be generated using JavaScript or TypeScript code libraries by a client-side agent, such as the client-side agent 106 as shown in FIG. 1, executing a script downloaded to the client as part of the request to load the application. This client-side agent script may then access the various libraries according to the refined manifest(s).

The client-side agent script may then download the various libraries and resolve code references between the various libraries to create the application. In other embodiments, the agent may be implemented, at least in part, as a server-side component and may additionally include compilation and linkage steps as required for the code types present in the libraries. These examples are not intended to be limiting, and any number of implementations to resolve code references between the various libraries may be envisioned.

Once the application has been generated according to the refined manifest(s), the application may be provided to the user via the agent, in some embodiments.

Figure 9:
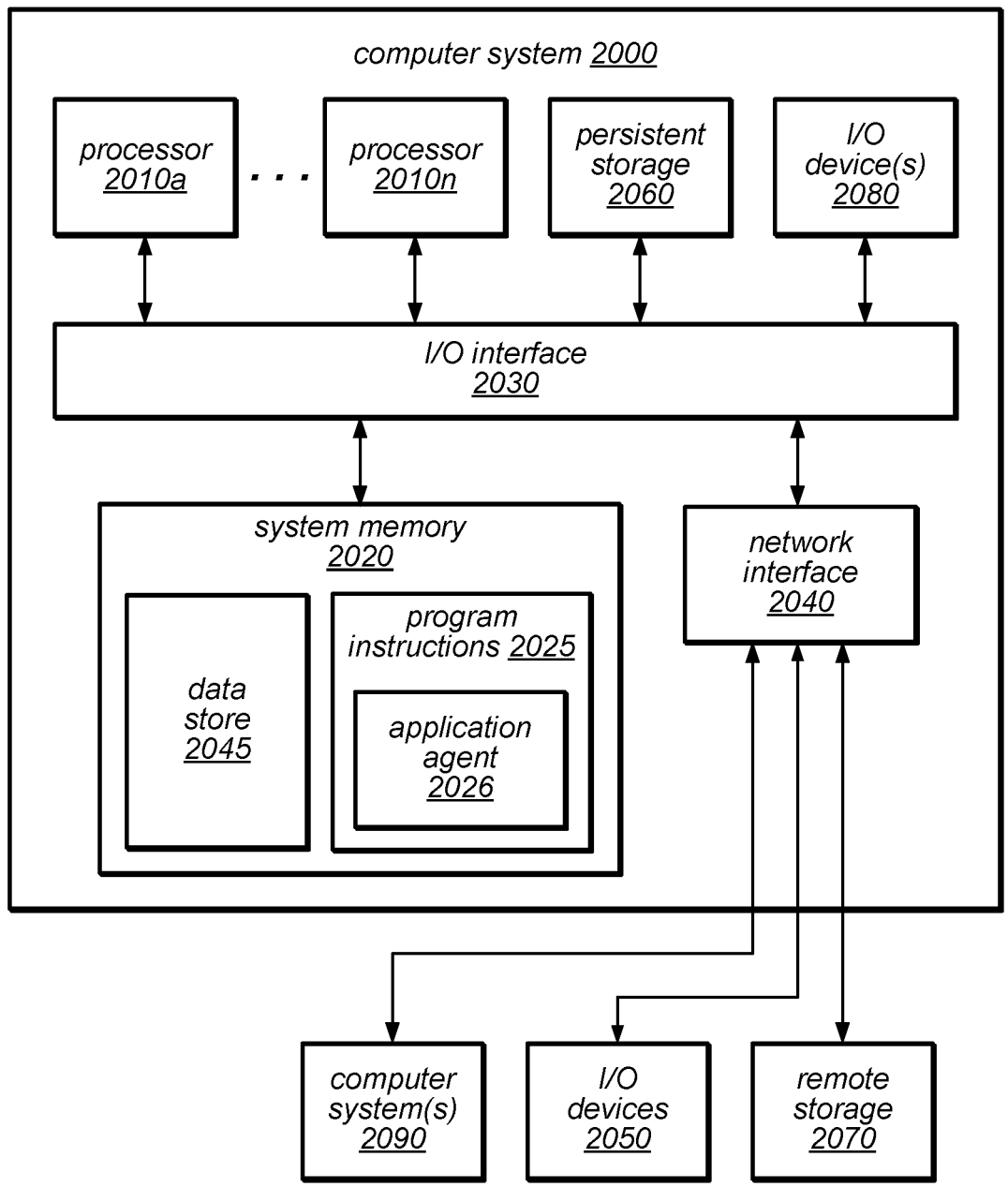
FIG. 9 is a block diagram illustrating an example computer system, according to various embodiments.

Any of various computer systems may be configured to implement processes associated with a technique for multi-region, multi-primary data store replication as discussed with regard to the various figures above. FIG. 9 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 9 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for the application agent, as indicated in 2026, are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 9 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more storage devices, comprising:
a plurality of executable code libraries collectively implementing an application, individual ones of the plurality of libraries comprising different ones of a plurality of versions of the executable code library distributed among a plurality of library cells stored at the one or more storage devices and a library manifest further comprising identifiers of the plurality of versions and cell selection criteria for the plurality of library cells;
an application manifest comprising identifiers for the plurality of executable code libraries collectively implementing the application; and
one or more processors and a memory storing program instructions that, when executed on the one or more processors, implement an application deployment system configured to:
generate one or more refined manifests based at least in part on the application manifest and the respective library manifests; the one or more refined manifests respectively comprising respective cell selections for individual ones of the plurality of executable code libraries, the respective cell selections identified according to the respective cell selection criteria; and
provide, responsive to a request for the application, a first version the application to a client, the first version the application comprising respective executable code libraries loaded from the respective cells of the plurality of libraries identified by the respective cell selections of the one or more refined manifests.

2. The system of claim 1, wherein the application deployment system is further configured to:
provide, responsive to another request for the application, second version of the application to the client, the second version of the application comprising respective libraries loaded from the respective cells of the plurality of executable code libraries identified by the respective cell selections of the one or more refined manifests including a version of a code execution library updated subsequent to providing the first version of the application.

3. The system of claim 1, wherein respective ones of the plurality of code execution libraries are deployed by respective packagers of a plurality of packagers, wherein the respective library manifests are defined by the respective packagers of the respective code execution libraries, wherein an packager for the application defines version constraints for a particular library of the plurality of executable code libraries in the application manifest, wherein the cell selection for the particular library is determined according to the version constraints, and wherein the packager for the application is different from at least one of the packagers of a plurality of packagers of the respective libraries.

4. The system of claim 3, wherein the application manifest comprises version constraints for one or more libraries of the plurality of executable code libraries, and wherein the respective cell selections for the ones or more libraries are determined according to the respective version constraints.

5. A computer-implemented method for delivering an application, comprising:
- deploying a plurality of libraries, wherein deploying individual ones of the plurality of libraries comprises distributing different ones of a plurality of versions of the library among a plurality of library cells and creating a library manifest comprising identifiers of the plurality of versions and cell selection criteria for the plurality of library cells;
- constructing an application manifest for the application comprising identifiers of the plurality of libraries; and
- receiving, from a client, a first request for the application, and responsive to receiving the first request:
  - generating one or more refined manifests for the client based at least in part on the application manifest and the respective library manifests; the one or more refined manifests respectively comprising cell selections for individual ones of the plurality of libraries, the respective cell selections identified according to the respective cell selection criteria; and
  - providing a first version of the application to the client, the first version of the application comprising respective libraries loaded from the respective cells of the plurality of libraries identified by the respective cell selections of the one or more refined manifests.

6. The method of claim 5, further comprising:
- receiving, from the client, a second request for the application subsequent to generating the one or more refined manifests, and responsive to receiving the second request providing the first version of the application to the client, the application comprising respective libraries loaded from the respective cells of the plurality of libraries identified by the respective cell selections of the one or more refined manifests.

7. The method of claim 5, wherein the application manifest comprises version constraints for one or more libraries of the plurality of libraries, and wherein the respective cell selections for the ones or more libraries are determined according to the respective version constraints and the respective cell selection criteria.

8. The method of claim 7, wherein respective ones of the plurality of libraries are deployed by respective packagers of a plurality of packagers, wherein the respective library manifests for respective ones of the plurality of libraries are defined by the respective packagers of the respective libraries, wherein an packager for the application defines the version constraints for the one or more libraries of the plurality of libraries, and wherein the packager for the application is different from at least one of the packagers of a plurality of packagers of the respective libraries.

9. The method of claim 7, wherein providing the first version of the application to the client comprises selecting a version of at least one library of the plurality of libraries according to the respective cell selection of the at least one library.

10. The method of claim 5, further comprising:
- subsequent to providing the first version of the application, updating, to a new version, a library in a cell of the library identified by the respective cell selection of the refined manifest; and
- receiving, from the client, a second request for the application subsequent to the first request, and responsive to receiving the second request providing a second version of the application to the client, the second version of the application comprising respective libraries loaded from the respective cells of the plurality of libraries identified by the respective cell selections of the one or more refined manifests including the updated version of the library.

11. The method of claim 5, wherein the cell selection criteria for at least one of the plurality of library cells comprises cell weighting criteria.

12. The method of claim 5, wherein the first version of the application comprises a library loaded from a cell identified by an override of the cell selection for the library.

13. The method of claim 5, wherein the respective pluralities of library cells for the respective plurality of libraries are provided by an application service of a provider network.

14. One or more non-transitory computer-accessible storage media storing program instructions that when executed on or across one or more computing devices cause the one or more computing devices to perform:
- storing a plurality of executable code libraries, wherein storing individual ones of the plurality of executable code libraries comprises distributing different ones of a plurality of versions of the executable code library among a plurality of library cells and creating a library manifest comprising identifiers of the plurality of versions and cell selection criteria for the plurality of library cells;
- constructing an application manifest for the application comprising identifiers of the plurality of libraries; and
- receiving, from a client, a first request for the application, and responsive to receiving the first request:
  - generating one or more refined manifests for the client based at least in part on the application manifest and the respective library manifests; the one or more refined manifests respectively comprising cell selections for individual ones of the plurality of executable code libraries, the respective cell selections identified according to the respective cell selection criteria; and
  - returning a first version of the application to the client, the first version of the application comprising respective executable code libraries loaded from the respective cells of the plurality of executable code libraries identified by the respective cell selections of the one or more refined manifests.

15. The one or more non-transitory computer-accessible storage media of claim 14, further comprising:
- receiving, from the client, a second request for the application subsequent to generating the one or more refined manifests, and responsive to receiving the second request providing the first version of the application to the client, the application comprising respective executable code libraries loaded from the respective cells of the plurality of executable code libraries identified by the respective cell selections of the one or more refined manifests.

16. The one or more non-transitory computer-accessible storage media of claim 14, wherein the application manifest comprises version constraints for one or more executable code libraries of the plurality of executable code libraries, and wherein the respective cell selections for the ones or more executable code libraries are determined according to the respective version constraints.

17. The one or more non-transitory computer-accessible storage media of claim 16, wherein respective ones of the plurality of executable code libraries are deployed by respective packagers of a plurality of packagers, wherein the respective library manifests for respective ones of the plurality of executable code libraries are defined by the respective packagers of the respective executable code libraries, wherein an packager for the application defines the version constraints for the one or more executable code libraries of the plurality of executable code libraries, and wherein the packager for the application is different from at least one of the packagers of a plurality of packagers of the respective executable code libraries.

18. The one or more non-transitory computer-accessible storage media of claim 16, further comprising:

subsequent to providing the first version of the application, updating, to a new version, an executable code library in a cell of the executable code library identified by the respective cell selection of the one or more refined manifests; and invalidating, subsequent to the updating and responsive to determining that the new version of the executable code library does not meet the version constraints of the application manifest, the one or more refined manifests.

19. The one or more non-transitory computer-accessible storage media of claim 14, wherein the cell selection criteria for at least one of the plurality of library cells comprises cell weighting criteria.

20. The one or more non-transitory computer-accessible storage media of claim 14, wherein the first version of the application comprises a library loaded from a cell identified by an override of the cell selection for the library.

* * * * *